United States Patent [19]

Jones et al.

[11] 4,132,280

[45] Jan. 2, 1979

[54] REVERSIBLY MOUNTABLE CLUTCH CONTROL HANDLE MOUNTED ON COLLAPSIBLE HANDLE OF WALK-BEHIND LAWN MOWER

[75] Inventors: Kenneth R. Jones, Thiensville; Daniel W. Schaefer, Port Washington, both of Wis.

[73] Assignee: Allis-Chalmers Corporation, Milwaukee, Wis.

[21] Appl. No.: 822,279

[22] Filed: Aug. 5, 1977

[51] Int. Cl.² ............................................. B62D 51/04
[52] U.S. Cl. ................................ 180/19 H; 16/111 A; 56/11.7; 180/74
[58] Field of Search ...................... 180/19 H, 19 R, 74; 56/10.5, 11.1, 11.7; 16/111 A

[56] References Cited

U.S. PATENT DOCUMENTS

| | | | |
|---|---|---|---|
| 2,736,389 | 2/1956 | Phelps | 180/74 X |
| 3,256,681 | 6/1966 | Phelps | 180/19 H |

OTHER PUBLICATIONS

*Operator's Manual*—19" & 21" *Strider Rotary Mower*—Allis-Chalmers Lawn & Garden Equipment, Form 1653379, Sep. 1974.

*Primary Examiner*—John A. Pekar
*Attorney, Agent, or Firm*—Robert C. Sullivan

[57] ABSTRACT

A reversibly mountable clutch control handle for a walk-behind lawn mower which may be pivotally mounted on the collapsible handle of the lawn mower in either one of two alternative mounting positions, whichever best suits the convenience and comfort of the operator, and in which the mower handle, the clutch control handle, and the control linkage associated with the clutch control handle are all collapsible to a folded position for storage or shipment in either of the mounting positions of the clutch control handle. The mower handle includes two laterally spaced legs lying in a common plane and connected at their upper end by a cross bar. In one of its alternative mounting arrangements, the clutch control handle when in its unclutched position lies above and forwardly of the common plane of the laterally spaced legs of the mower handle, while in the other of its alternative mounting arrangements, the clutch control handle when in its unclutched position lies below and rearwardly of the aforementioned common plane. When the clutch control handle is "squeezed" by the operator toward the common plane of the mower handle legs, belt-driven drive rollers are moved into driving engagement with the rear drive wheels of the mower, and when the operator releases the clutch control handle, the belt-driven drive rollers are moved by the tension of the drive belt for the rollers out of driving engagement with the rear wheels of the mower.

5 Claims, 9 Drawing Figures

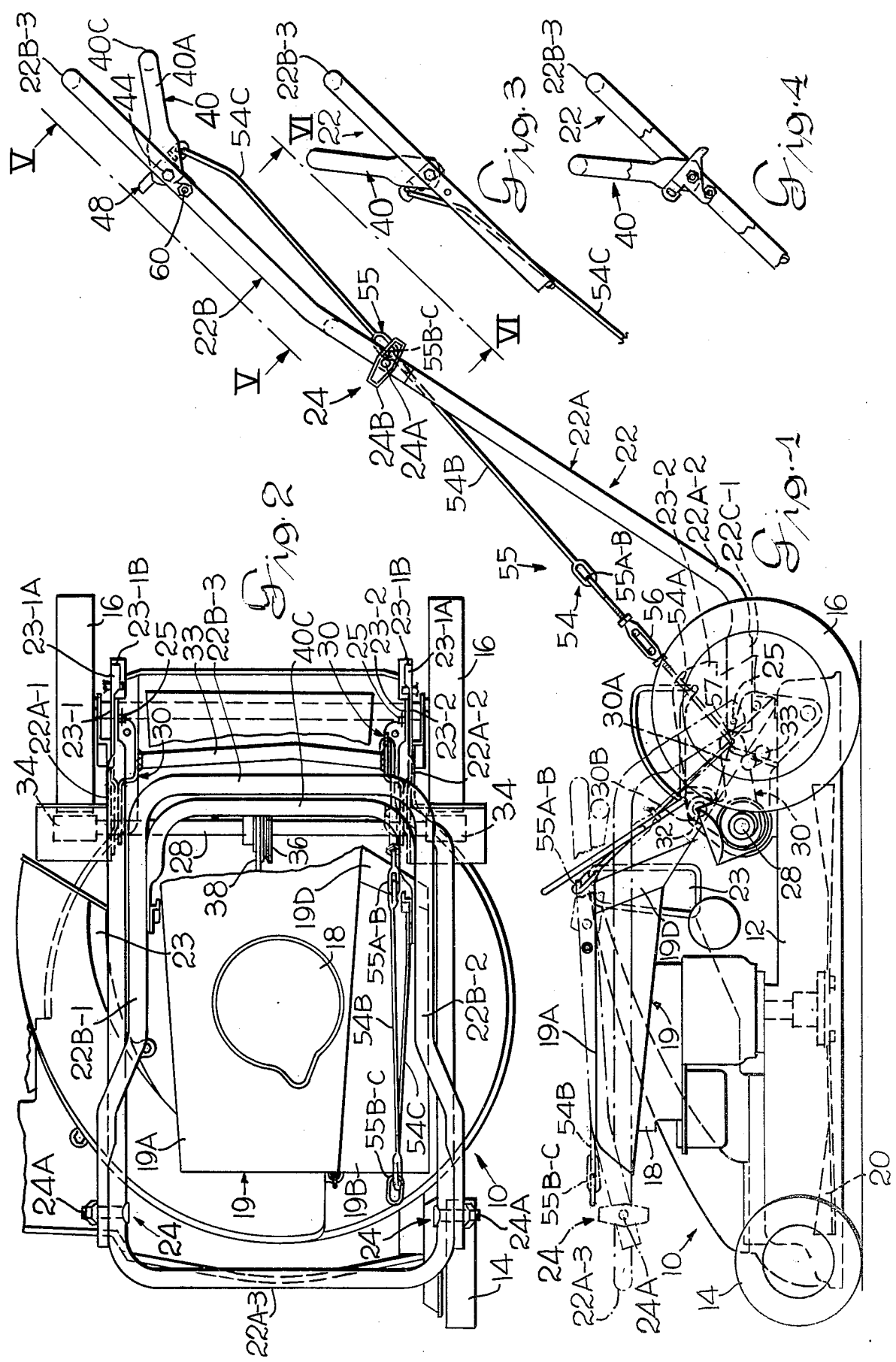

REVERSIBLY MOUNTABLE CLUTCH CONTROL HANDLE MOUNTED ON COLLAPSIBLE HANDLE OF WALK-BEHIND LAWN MOWER

BACKGROUND OF THE INVENTION

1. Field of the Invention

This invention relates to self-propelled walk-behind lawn mowers, and more particularly to a clutch control handle or lever for controlling the connection or disconnection of the drive wheels of the self-propelled lawn mower relative to a source of motive power and mounted on a collapsible mower handle, and more specifically to a clutch control handle or lever mounted on the handle of the lawn mower and reversibly mountable relative to the mower handle in either one of two different alternative positions, whichever best suits the needs and comfort of the operator of the lawn mower, and in which the mower handle is collapsible to a substantially horizontal folded position in either of the alternative mounting positions of the clutch control handle.

2. Description of the Prior Art

In self-propelled walk-behind lawn mowers of a type previously manufactured and sold by applicants' assignee, it has been known to pivotally mount a clutch control handle of generally U-shape on the upper portion of the mower handle and to connect crank members carried by each of the opposite legs of the clutch control handle by means of corresponding control linkages to corresponding oppositely disposed pivotally mounted bell cranks which support friction rollers mounted on a common belt-driven shaft. When the pivotally mounted clutch control handle was "squeezed" by the operator toward the plane of the mower handle, the belt-driven rollers were moved into frictional driving engagement with the rear drive wheels of the lawn mower, and when the clutch control handle was released by the operator, the belt-driven rollers were moved out of driving engagement with the rear wheels of the mower by the tension of the drive belt for the shaft on which the friction rollers were mounted.

In the self-propelled lawn mower of the type just described, as previously manufactured by applicants' assignee, the clutch control handle while structurally capable of being mounted on the mower handle so as to lie when in its unclutched position in a plane either forwardly or rearwardly of the plane of the mower handle, as a practical matter could only be mounted so as to lie when its unclutched position in a plane forwardly of the plane of the mower handle. This was because of the fact that due to the particular collapsible arrangement of the mower handle on which the clutch control handle was mounted, as previously manufactured by applicants' assignee, the mower handle, clutch control handle, and the control linkage associated with the clutch control handle could only be moved to collapsed position for storage or shipment when the clutch control handle was so mounted on the mower handle as to lie forwardly of the mower handle when in unclutched position. In the prior art mower just described, the entire mower handle did not collapse to a substantially horizontal position even with the clutch control handle mounted so as to lie forwardly of the plane of the mower handle when in its unclutched position.

A rotary lawn mower of the type previously manufactured by applicants' assignee is described and shown in a publication entitled "Operator's Manual — 19" & 21" STRIDER ROTARY MOWER — Allis-Chalmers Lawn & Garden Equipment, Form 1653379 (9/74)."

It is known in the prior art to provide a walk-behind lawn mower with a handle which is formed in two pivotally connected sections which are normally secured in an extended position with respect to each other but which can be folded with respect to each other about their pivotal connection when it is desired to have the mower handle mounted on the mower in a collapsed condition for storage or for shipment.

The following United States patents show examples of prior art mowers of the type just mentioned in which the mower handle can be folded to collapsed position: U.S. Pat. No. 2,727,753, issued to Herbert C. Johnson et al on Dec. 20, 1955; U.S. Pat. No. 3,357,716, issued to Alexander B. Musichuk on Dec. 12, 1967; U.S. Pat. No. 3,462,924, issued to Warren H. Price et al on Aug. 26, 1969; U.S. Pat. No. 3,855,763, issued to Lester H. Seifert et al on Dec. 24, 1974; and U.S. Pat. No. 3,950,817, issued to Russel Marius McKaig on Apr. 20, 1976.

STATEMENT OF THE INVENTION

Accordingly, it is an object of the present invention to provide for use with and in combination with a self-propelled lawn mower of the walk-behind type a clutch control lever or handle which is mounted on the collapsible handle of the lawn mower for selectively connecting or disconnecting the drive wheels of the self-propelled lawn mower relative to the source of motive power of the lawn mower, and in which the clutch control handle or lever may be interchangeably reversibly mounted relative to the mower handle in order to best suit the requirements and comfort of the operator, with the mower handle being collapsible to a substantially horizontal folded position in either of the alternative mounting positions of the clutch control handle.

It is a further object of the invention to provide in combination with a collapsible lawn mower handle, a "dead man" clutch control lever or handle for selectively connecting or disconnecting the drive wheels of a self-propelled lawn mower relative to the source of motive power, and in which the mounting relation of the clutch control handle to the handle of the lawn mower may be reversibly interchanged in order to suit the requirements and comfort of the operator, and in which the mower handle, the clutch control handle, and a substantial portion of the control linkage for the clutch control handle are all collapsible to a substantially horizontal folded position for storage or shipment in either of the alternative mounting positions of the clutch control handle.

In achievement of these objectives, there is provided in accordance with an embodiment of the invention, a reversibly mountable clutch control handle for a walk-behind lawn mower which may be pivotally mounted on the collapsible handle of the lawn mower in either one of two alternative mounting positions, whichever best suits the convenience and comfort of the operator, with the mower handle, the clutch control handle, and the control linkage associated with the clutch control handle all being collapsible to a folded position for storage or shipment in either of the mounting positions of the clutch control handle. In the illustrated embodiment, the clutch control handle is of U-shape and includes two laterally spaced legs connected at their upper end by a cross bar. The lower end of each leg of the clutch control handle has affixed thereto a crank portion which is inclined relative to the axis of the corresponding leg of the clutch control handle, each crank portion including a slotted end which projects beyond its respective leg. One of the legs of the clutch control handle carries an abutment which cooperates with an abutment on the mower handle to limit the movement of the clutch control handle in an unclutching direction. In one of its alternative mounting arrangements, the clutch control handle when in its unclutched position lies above and forwardly of the plane of the mower handle, while in the other of its alternative mounting arrangements, the clutch control handle when in its unclutched position lies below and rearwardly of the plane of the mower handle. To reposition the clutch control handle from one to the other of its alternative mounting positions, the bolts which pivotally mount the clutch control handle to the mower handle are removed and the clutch control handle is rotated through 180 degrees whereby to reverse the legs of the mower handle to which a given leg of the clutch control handle is pivotally connected. In the mounting arrangement in which the clutch control handle lies forwardly of the plane of the mower handle when in unclutched position, the slotted end of each crank portion projects above the plane of the clutch control handle, while in the other alternative mounting arrangement in which the clutch control handle lies rearwardly of the plane of the mower handle when in unclutched position, the slotted end of each crank portion projects below the plane of the clutch control handle.

In either of the alternative mounting positions of the clutch control handle, a control linkage is connected on one lateral side of the mower only between the slotted end of the crank member carried by the clutch control handle on the given lateral side of the mower and one only of a pair of laterally oppositely disposed pivotally mounted bell cranks on which belt-driven rollers are carried, whereby when the pivotally mounted clutch control handle is "squeezed" by the operator toward the plane of the mower handle, the belt-driven rollers are moved into driving engagement with the rear drive wheels of the lawn mower, and when the clutch control handle is released by the operator, the belt-driven rollers are moved by the tension of the drive belt for the rollers out of driving engagement with the rear wheels of the mower. The two oppositely disposed bell cranks which support the belt-driven rollers are rigidly connected together by a rigid torque rod whereby the two bell cranks move together in unison.

BRIEF DESCRIPTION OF THE DRAWINGS

Further objects and advantages of the invention will become apparent from the following description taken in conjunction with the accompanying drawings in which:

FIG. 1 is a view in side elevation, of a self-propelled walk-behind lawn mower provided with a reversibly mountable clutch control handle or lever in combination with and mounted on a collapsible mower handle in accordance with the invention, with the clutch control handle being shown in one of its two alternative positions, namely, the position in which the clutch control handle when in its unclutched position lies rearwardly of the plane of the mower handle, and with a phantom view of the mower handle and associated clutch control handle and clutch control linkage in collapsed condition;

FIG. 2 is a top plan view, partially broken away, of the lawn mower of FIG. 1 with the mower handle and associated clutch control handle and clutch control linkage being shown in folded, collapsed condition;

FIG. 3 is a view in side elevation of the upper portion of the lawn mower handle, with the clutch control handle being shown in the other of its alternative positions as compared to the position shown in FIG. 1, namely, the position in which the clutch control handle when in its unclutched position lies forwardly of the plane of the mower handle;

FIG. 4 is a view in vertical section of the upper portion of the lawn mower handle showing the reversibly positionable clutch lever or handle mounted in the same position as in FIG. 3, but showing the oppositely disposed leg of the clutch control handle as compared to the view of FIG. 3, and showing the abutment arrangement for limiting the motion of the clutch control handle in an unclutching direction;

DESCRIPTION OF THE PREFERRED EMBODIMENT

Figure 5:
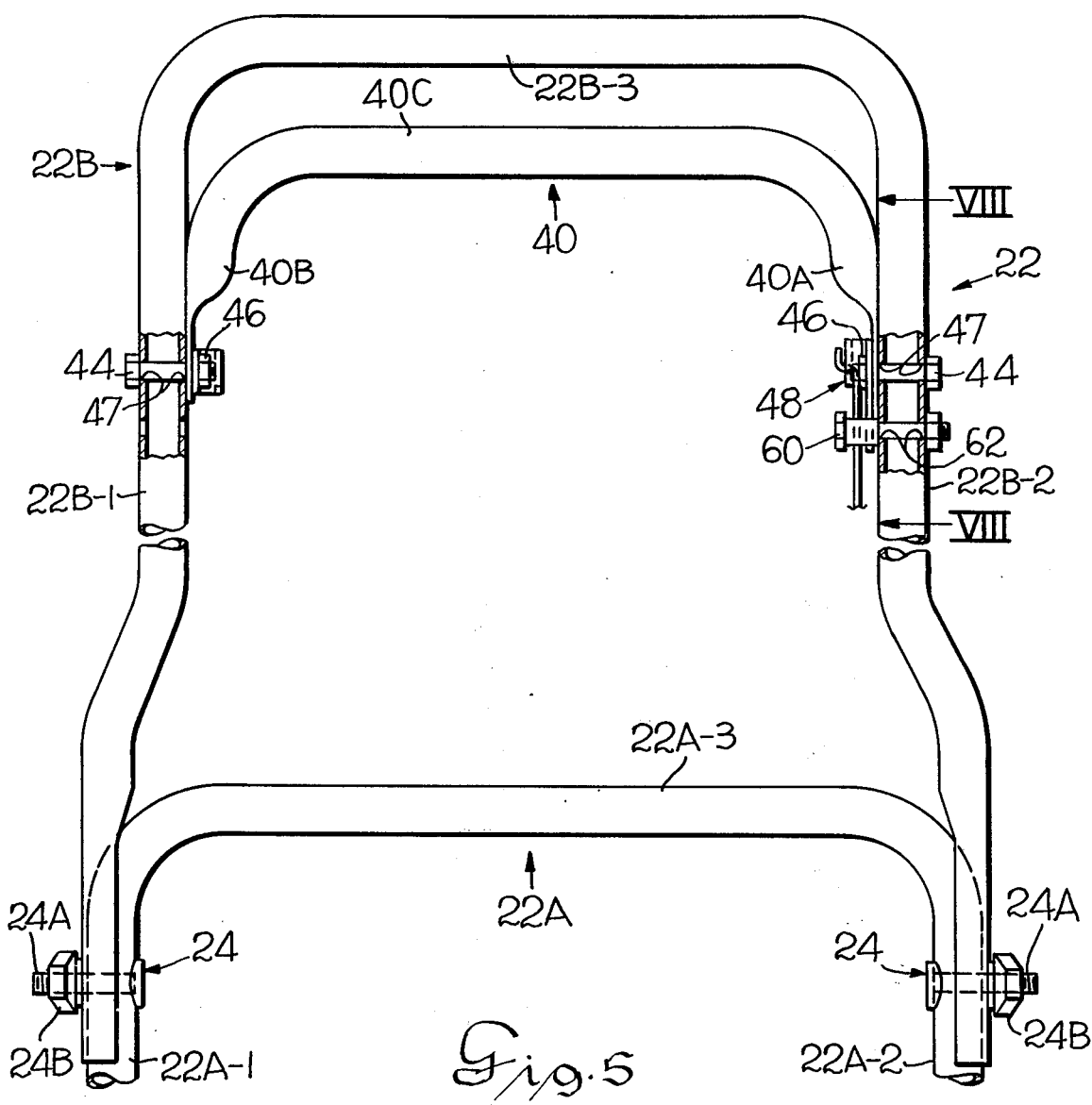
FIG. 5 is a view of the upper end of the mower handle and attached clutch control handle taken along section line V—V of FIG. 1.

Referring now to the drawings, there is shown a self-propelled walk-behind lawn mower generally indicated at 10 including a mower deck 12 which is supported for movement along the ground by a front wheel or wheels 14 and by laterally spaced rear drive wheels 16 which are driven from the internal combustion engine or other suitable prime mover indicated at 18 through a clutching arrangement which will be described hereinafter. The internal combustion engine or other prime mover 18 also rotatably drives a mower blade indicated in dotted outline at 20. Engine 18 is covered and shielded by a shroud 19 which is supported by the rear portion of mower deck 12, and which can be swung upwardly and rearwardly about a hinge axis at the rear of the mower to provide access to engine 18.

Figure 7:
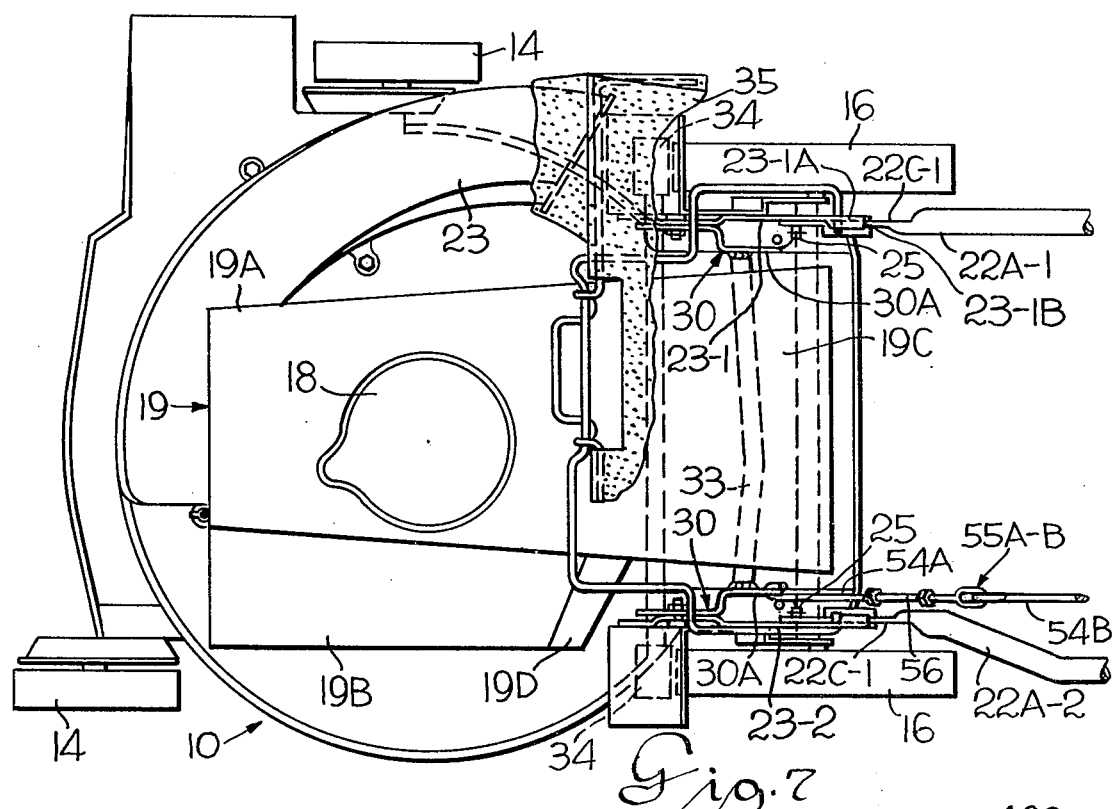
FIG. 7 is a top plan view of the mower with the mower handle (partially broken away) shown in extended or uncollapsed position.

As best seen in the view of FIG. 7, engine shroud 19 includes substantially flat normally horizontal uppermost surface portions 19A and 19B, a downwardly inclined rear surface portion 19C which extends downwardly from the rear boundary of upper normally horizontal surface portion 19A, and a downwardly inclined surface portion 19D which extends downwardly from the rear boundary of upper normally horizontal surface portion 19B.

Mower 10 is provided with a handle generally indicated at 22 formed of hollow tubular metal. In the illustrated embodiment handle 22 is of the collapsible or folding type to provide compact shipping and storage of the mower handle 22, including a lower handle section generally indicated at 22A and an upper handle section generally indicated at 22B. Lower mower handle section 22A includes two laterally spaced legs respectively indicated at 22A-1 and 22A-2 (FIG. 5) which are respectively pivotally connected to corresponding pintles 25 carried by mounting brackets 23-1 and 23-2 respectively mounted on the right and left-hand sides of the rear portion of mower deck 12 as viewed from the rear of the mower housing. Upper mower handle section 22B includes two laterally spaced legs respectively indicated at 22B-1 and 22B-2 which are respectively pivotally connected on the corresponding sides of the mower handle to the corresponding legs 22A-1 and 22A-2 of lower mower handle section 22A by suitable connection means indicated at 24 including a threaded bolt 24A and a cooperating wing nut 24B which can be loosened relative to each other to permit pivotal folding action of upper handle section 22B relative to lower handle section 22A when it is desired to collapse handle 22 for storage or for shipment. Lower mower handle section 22A is provided with a cross bar portion 22A-3 which connects the upper ends of mower handle legs 22A-1 and 22A-2. Similarly, upper mower handle section 22B is provided with a cross bar 22B-3 which connects handle leg members 22B-1 and 22B-2 to define an upper handle section 22B of substantially U-shape.

The casing 12 of mower 10 is provided contiguous the forward end thereof with a grass discharge outlet which is connected by a discharge chute 23 having a discharge outlet to which the inlet end of a rear-mounted grass collection bag 35 may be detachably connected. The upper rear end of grass collection bag 35 is provided with a rod-like member (not shown) which is detachably hooked over cross bar portion 22A-3 of lower mower handle section 22A to retain bag 35 in place on the mower. The lower end of grass collection bag 35 is detachably hooked onto bracket member 37 formed of rod-like material which, in turn, is detachably supported by the oppositely disposed support brackets 23-1, 23-2 which are mounted on the rear portion of mower deck 12.

In order to rotatably drive rear wheels 16 of mower 10, a driving and clutching arrangement is provided which will now be described:

A rear wheel drive shaft 28 is supported contiguous opposite sides of the mower housing but forwardly of rear drive wheels 16 by oppositely disposed bell cranks 30 each generally indicated at 30. Each bell crank 30 includes an approximately horizontal leg portion 30A which extends rearwardly with respect to the front-rear dimension of the mower, and an approximately vertical leg portion 30B. Drive shaft 28 is supported at its opposite ends for rotation by suitable bearings carried by the respective oppositely disposed bell cranks 30, shaft 28 being supported by each bell crank substantially at the junction between the approximately horizontal and vertical portions 30A and 30B of the respective bell crank. Each bell crank 30 is pivotally mounted on a corresponding one of the support brackets 23-1, 23-2 carried by the mower housing for angular swinging movement of each respective bell crank with respect to its corresponding support bracket 23-1, 23-2 about a corresponding pivot point 32.

The two oppositely disposed bell cranks 30 are rigidly connected together by a rigid torque bar or rod 33 which is suitably connected as by welding at each of its opposite ends to a corresponding one of the bell cranks 30. The rigid interconnection of the two bell cranks 30 to each other causes the two bell cranks 30 to move together in unison when the control linkage 54 which is connected between clutch control handle 40 and one only of the bell cranks 30 (namely, the bell crank 30 at the left-hand side of the mower as viewed from the rear of the mower) is actuated by movement of clutch control handle 40 to clutched position. Torque rod 33 is curved intermediate its length to make room for a speed changing mechanism for shaft 28 (not shown) mounted on the upper surface of mower casing 12, and which forms no part of the present invention.

Drive shaft 28 has fixed to each of the opposite ends thereof a frictional drive roller each indicated at 34. The radially outer surface of each drive roller 34 is knurled to provide a good frictional contact with the corresponding rear drive wheel 16 when it drivingly engages the corresponding drive wheel 16. Drive rollers 34 rotate with drive shaft 28 and are adapted to frictionally engage rear drive wheels 16 of mower 10 in driving relation when drive rollers 34 are moved into driving engagement with rear wheels 16 as will be described hereinafter.

Drive shaft 28 has a pulley member 36 mounted thereon substantially centrally of the length of shaft 28. A drive belt 38 is trained around pulley 36 to continuously rotatably drive shaft 28 and consequently to continuously rotatably drive the oppositely disposed drive rollers 34 mounted on shaft 28 when the internal combustion engine 18 or other prime mover is in operation. Drive belt 38 is suitable connected to and driven by the output shaft of internal combustion engine 18 or other prime mover.

A clutch control lever or handle generally indicated at 40 is provided for moving rear wheel drive shaft 28 and the drive rollers 34 carried thereby into frictional driving engagement with rear wheels 16. Clutch control lever or handle 40 is characterized by the fact that it is selectively reversibly mountable in either one of two different mounting positions with respect to mower handle 22 so as to lie either forwardly of the plane of mower handle 22 in the unclutched position of clutch control handle 40 as seen in the views of FIGS. 3, 4 and 6, or so as to lie rearwardly of the plane of mower handle 22 in the unclutched position of clutch control handle 40 as seen in the views of FIGS. 1 and 5, whereby to permit mounting of clutch control handle 40 in whichever position best suits the convenience and comfort of the operator.

Figure 6:
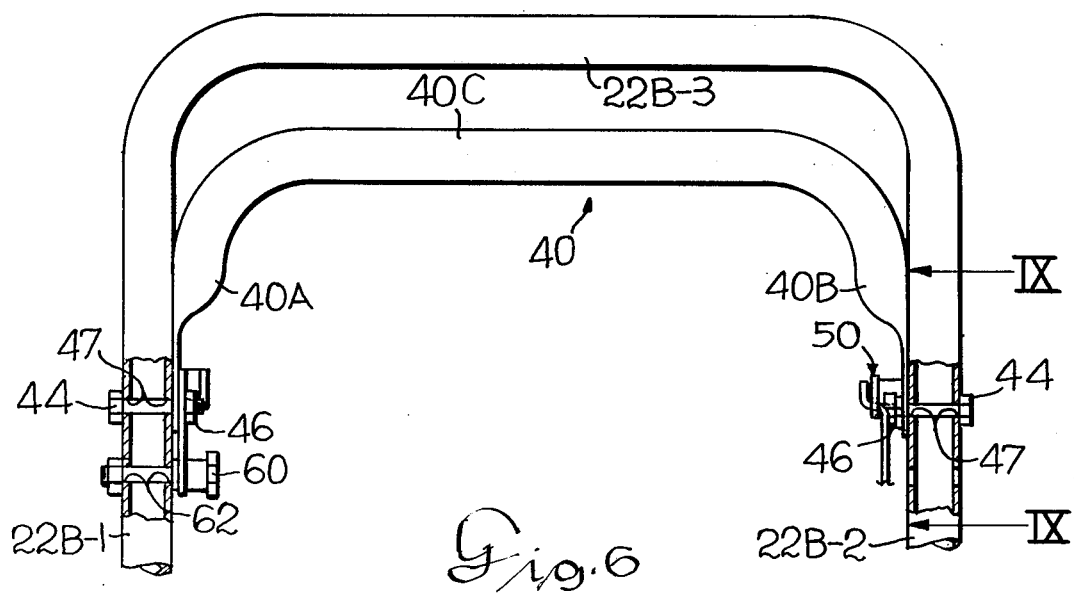
FIG. 6 is a view taken along section line VI—VI of FIG. 3.

As best seen in the views of FIGS. 5 and 6, clutch control handle 40 is of generally U-shape and includes a pair of oppositely disposed legs respectively indicated at 40A and 40B which are connected together at the outer ends thereof by a cross bar 40C. The transverse dimension between the laterally outside surfaces of clutch handle legs 40A and 40B is such that clutch control handle 40 is adapted to be received between the inside surfaces of legs 22B-1 and 22B-2 of upper section 22B of mower handle 22. The lower end portions of oppositely disposed legs 40A and 40B of clutch control handle 40 are each provided with an aperture 42 (FIGS. 8 and 9) and oppositely disposed pivot bolts 44 extend through apertures 42 and through the corresponding apertures 47 in the contiguous mower handle leg 22B-1 or 22B-2, as the case may be, to mount clutch handle 40 for pivotal movement with respect to upper portion 22B of mower handle 22. A nut 46 is secured on the threaded end of each pivot bolt 44.

Figure 8:
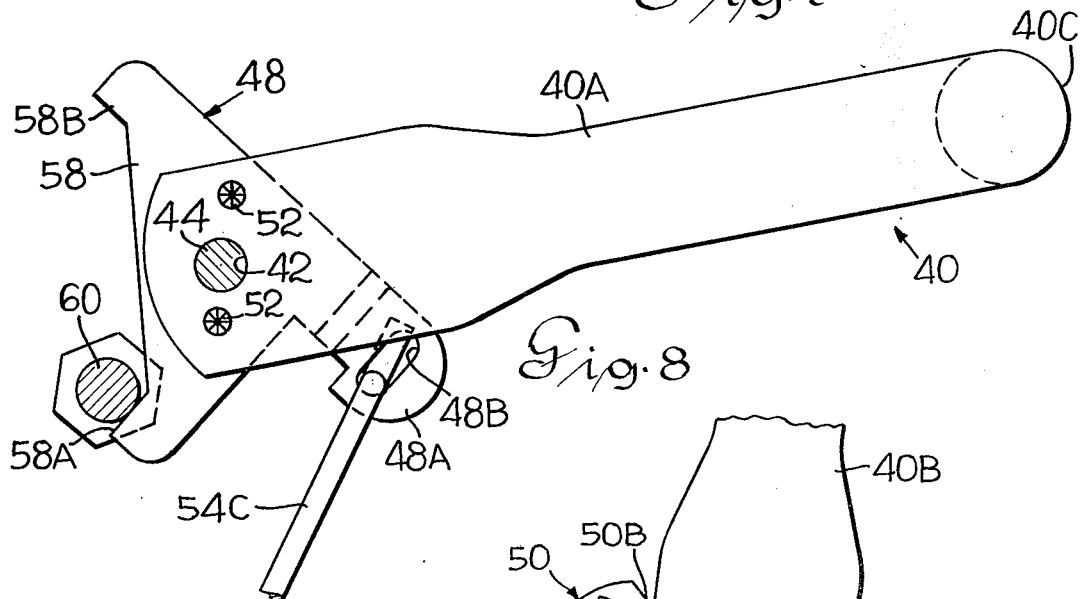
FIG. 8 is a view taken in section along line VIII—VIII of FIG. 5.
Figure 9:
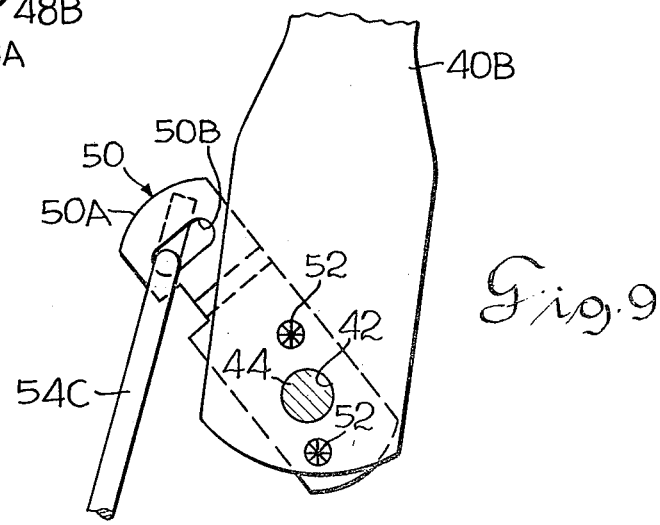
FIG. 9 is a view taken along section line IX—IX of FIG. 6.

As best seen in the views of FIGS. 8 and 9, each of the oppositely disposed legs 40A and 40B of clutch control handle 40 is provided at the lower end thereof and in fixed relation to the respective legs 40A and 40B with what might be referred to as a crank member or lever generally indicated at 48 on leg 40A and generally indicated at 50 on leg 40B. In the specific embodiment illustrated in FIGS. 8 and 9, the respective crank members or levers 48 and 50 are rigidly connected as by spot welds 52 to the lower portions of the respective legs 40A and 40B.

Each of the respective crank members 48 and 50 extends at an inclination or angle relative to the longitudinal axis of the respective leg 40A, 40B to which it is attached, and each of the respective crank members 48, 50 includes a portion 48A or 50A, respectively, which projects beyond the plane defined by the U-shaped clutch control handle and in the same direction as the direction in which the other crank portion 48A or 50A projects. That is, when clutch control handle 40 is mounted to lie forwardly of the plane of mower handle 22 when in its unclutched position as seen in FIGS. 3, 4 and 6, both of the crank portions 48A, 50A of FIGS. 8 and 9 project forwardly of the plane of clutch control handle 40. When clutch control handle 40 is mounted as seen in the views of FIGS. 1 and 5 so as to lie rearwardly of the plane of mower handle 22 when clutch control handle 40 is in its unclutched condition, the respective crank portions 48A, 50A both lie below the plane of clutch control handle 40.

As best seen in the view of FIG. 8, crank member 48 which is mounted at the lower end of leg 40A of clutch control handle 40 has formed integrally therewith a plate member 58 which is formed so as to be provided with oppositely disposed projections or abutments 58A and 58B, respectively, which are symmetrically positioned at opposite ends of plate member 58 and an opposite sides of the longitudinal axis of clutch control handle leg 40A. In both of the alternative mounting positions of clutch control handle 40, abutment 58A cooperates with a stop-bolt 60 (FIGS. 1, 4, 5, 6 and 8) carried by mower handle leg 22B-1, or 22B-2 as the case may be, to limit the movement of clutch control handle 40 in the unclutching direction.

Each of the respective crank portions 48A, 50A carried by the respective clutch control handle legs 40A, 40B includes a slot 48B, 50B, respectively, which is adapted to be engaged by the upper end of a control linkage generally indicated at 54. The lower end of control linkage 54 is connected to a rearward portion of the approximately horizontal rearwardly extending leg 30A of one of the bell cranks 30 on which rear wheel drive shaft 28 is supported. A turnbuckle 56 is connected in linkage 54 to permit any necessary adjustment of linkage 54. Linkage 54 is provided with several chain links 55 at appropriate locations as will be described which permit linkage 54 to fold when mower handle 22 and the associated clutch control handle 40 and control linkage 54 are all folded together into the folded position shown in FIGS. 1 and 2 for storage or shipment.

Control linkage 54 is positioned on only one lateral side of the mower, and, in the embodiment illustrated in the drawings, control linkage 54 is shown as being on the left-hand side of the mower as viewed from the rear of the mower, since grass collection bag 35 due to its connection to grass chute 23 on the right-hand side of the mower (as viewed from the rear of the mower) provides an obstruction which makes it impractical to connect clutch control linkage 54 on the right-hand side of the mower (as viewed from the rear of the mower).

More specifically, and as best seen in the view of FIG. 1, control linkage 54 includes a lower control linkage section 54A, an intermediate control linkage section 54B, and an upper control linkage section 54C. Lower control linkage section 54A which includes the turnbuckle 56 is pivotally connected at its lower end at point 57 to a rearwardly located portion of the rearwardly extending leg 30A of the bell crank 30 which is located at the left-hand side of the mower as viewed from the rear of the mower. The opposite and normally upper end portion of lower control linkage section 54A is provided with a link which engages a similar link at the normally lower end of intermediate control linkage section 54B whereby to provide a pivotal connection indicated at 55A-B between the lower and intermediate control linkage sections 54A and 54B.

Similarly, the normally upper end of intermediate control linkage section 54B is provided with a link which engages a similar link at the normally lower end of normally upper control linkage section 54C whereby to provide a pivotal connection indicated at 55B-C between the intermediate and the upper control linkage sections 54B and 54C. The normally upper end of upper control linkage section 54C is pivotally connected to the slot 48B of crank 48 on clutch control leg 40A when clutch control handle 40 is mounted in the position shown in FIGS. 1, 5 and 8, and the upper end of control linkage section 54C is connected to slot 50B of crank member 50 on leg 40B of clutch control handle 40 when clutch control handle 40 is mounted in the other alternative mounting position shown in FIGS. 3, 4, 6 and 9.

The lower pivotal connection 55A-B between lower and intermediate control linkage sections 54A and 54B is so located that when mower handle 22 and associated clutch control handle 40 and control linkage 54 are folded to the collapsed position shown in FIGS. 1 and 2, and in which collapsed lower control linkage section 54A lies along inclined surface 19D of engine shroud 19, the pivotal connection 55A-B between control linkage sections 54A and 54B will be so located as to permit intermediate control linkage section 54B to pivot forwardly about pivotal connection 55A-B so as to lie in a substantially horizontal plane.

Also, the pivotal connection 55B-C between intermediate control linkage section 54B and upper control linkage section 54C is so located as to substantially coincide with the pivotal connection between lower and upper mower handle sections 22A, 22B, whereby when upper mower handle section 22B is folded with respect to lower mower handle section during the handle collapsing operation, the normally upper control linkage section 54C will fold relative to intermediate control linkage section 54B about a pivotal axis 55B-C which coincides with the pivotal axis about which mower handle sections 22A, 22B fold with respect to each other.

It should also be noted that the length of the lower normally horizontal portion 22C-1 of each of the legs 22A-1, 22A-2 of lower mower handle section 22A are such that when the mower handle is moved to collapsed condition as seen in FIGS. 1 and 2, the upper end of end portion 22C-1 is at such a level that the remainder of each respective mower handle leg 22A-1, 22A-2 of lower mower handle section 22A extends in a substantially horizontal plane at a level which substantially coincides with the upper surface 19A of engine shroud 19.

If it is desired to have clutch control handle 40 mounted as shown in FIGS. 1, 5 and 8 in which the clutch control handle when in its unclutched position lies in a plane below and rearwardly of the plane of mower handle 22, clutch control handle 40 is rotated through an angle of 180 degrees as compared to the mounting position of the clutch control handle shown in FIGS. 3, 4, 6 and 9, so that in the position of FIGS. 1, 5 and 8, the orientation of the respective legs 40A and 40B of clutch control handle 40 is reversed with respect to the positions which they occupy in the views of FIGS. 3, 4, 6 and 9; that is, in the position shown in FIGS. 1, 5 and 8 in which clutch control handle 40 when in its unclutched position lies below and rearwardly of the plane of mower handle 22, leg 40B of clutch control handle 40 lies contiguous leg 22B-1 of mower handle 22, and leg 40A of clutch control handle 40 lies contiguous leg 22B-2 of mower handle 22. This is just the reverse of the relative orientation of the clutch control handle legs and the mower handle legs shown in the clutch control handle mounting arrangement of FIGS. 3, 4, 6 and 9 in which clutch control handle 40 when in its unclutched position lies forwardly of the plane of mower handle 22.

Also, in the clutch control handle mounting arrangement of FIGS. 1, 5 and 8, end portion 48A of crank member 48 at the lower end of leg 40A which contains cable receiving slot 48B, and also end portion 50A of crank member 50 at the lower end of leg 40B which contains cable receiving slot 50B both lie beneath the plane of clutch control handle 40 when clutch control handle 40 is in the unclutched position shown in FIGS. 1, 5 and 8.

In each of the alternative mounting positions of clutch control handle 40, namely, in the first alternative position shown in FIGS. 1, 5 and 8, and in the second alternative position shown in FIGS. 3, 4, 6 and 9, clutch control handle 40 is pivotally movable relative to upper mower handle section 22B by means of the bolts 44 which pivotally mount the respective opposite clutch handle legs 40A, 40B to the corresponding legs of upper mower handle section 22B for the particular mounting position.

In the mounting position of clutch control handle 40 shown in FIGS. 1, 5 and 8, leg 40A of handle 40 and crank member 48 carried by leg 40A, and abutment 58A carried by crank member 48 (FIG. 8) all lie at the left-hand side of the mower as viewed from the rear of the mower, and leg 40B of handle 40 and crank member 50 carried by clutch handle leg 40B lie at the right-hand side of the mower as viewed from the rear of the mower. Consequently, with clutch control handle 40 in the mounting position shown in FIGS. 1, 5 and 8, the control linkage 54 which in the illustrated embodiment and as previously mentioned is always at the left-hand side of the mower (as viewed from the rear of the mower) for both the alternative clutch handle mounting positions, is connected at one end thereof to slot 48B of crank member 48, the opposite end of control linkage 54 being connected at pivot point 57 to the rearwardly extending arm 30A of bell crank 30 on the left-hand side of the mower as viewed from the rear of the mower. With clutch control handle 40 in the mounting position shown in FIGS. 1, 5 and 8, stop bolt 60 is mounted in aligned apertures 62 of the walls of hollow mower handle leg 22B-2. Stop bolt 60 cooperates with abutment 58A carried by the lower end of leg 40A of clutch control handle 40 to limit movement of clutch control handle 40 in the unclutching direction when handle 40 is in the mounting position shown in FIGS. 1, 5 and 8.

With clutch control handle 40 in the mounting position shown in FIGS. 1, 5 and 8, if it is desired to move drive rollers 34 to a position in which they drivingly engage rear drive wheels 16 of the mower to thereby propel the mower forwardly, the operator grasps cross bar 22B-3 of mower handle 22 and at the same time grasps cross bar 40C of clutch control handle 40, and "squeezes" clutch control handle cross bar 40C in a counterclockwise direction relative to the view shown in FIG. 1 toward the plane of mower handle 22, thereby swinging both of the oppositely disposed laterally spaced bell cranks 30, which are rigidly connected to each other by torque rod 33, in a counterclockwise direction relative to the view of FIG. 1 about their respective pivot points 32 to a position in which drive rollers 34 drivingly engage rear drive wheels 16 of the mower. As long as the operator maintains clutch control handle 40 in the position just described, drive rollers 34 will frictionally engage rear drive wheels 16 to propel the mower. However, if the operator releases the pressure on clutch control handle 40, handle 40 will return to the unclutched position shown in the view of FIG. 1 due to the biasing effect of drive belt 38 which swings both bell cranks 30 in a clockwise direction with respect to the view of FIG. 1 about the respective pivot points 32 of the bell cranks to thereby retract drive rollers 34 out of driving engagement with rear drive wheels 16 of the mower, whereby the mower will no longer be propelled by the prime mover, such as the internal combustion engine 18. When bell cranks 30 are swung in a clockwise direction relative to the view of FIG. 1 by the biasing effect of drive belt 38 as just described, control linkage 54 causes clutch control handle 40 to return to the unclutched position as seen in FIG. 1.

In the mounting arrangement shown in the views of FIGS. 3 and 4, clutch control handle 40 when in its unclutched position lies forwardly of the plane of mower handle 22. Just as in the clutch handle mounting arrangement shown in FIGS. 1, 5 and 8, the tension on drive belt 38 which engages pulley 36 on drive shaft 28 normally causes the connected bell cranks 30 to swing in a clockwise direction relative to the view of FIG. 1, about the pivotal axes 32 of the respective bell cranks 30 to thereby move drive rollers 34 at the opposite ends of shaft 28 out of driving relation with rear wheels 16 of the mower, and also causing clutch control handle 40 to be moved by control linkage 54 to the unclutched position shown in FIGS. 3, 4 and 6.

As best seen in the view of FIG. 6, with clutch control handle 40 mounted so as to lie forwardly of the plane of mower handle 22 when in the unclutched position shown in FIGS. 3 and 4, clutch control handle 40 is so oriented with respect to mower handle 22 that leg 40A (FIG. 8) of clutch control handle 40 is at the operator's right as viewed from the rear of the mower, and leg 40B (FIG. 9) is at the operator's left as viewed from the rear of the mower. In this position of the clutch control handle, linkage 54 is connected to slot 50B of crank member 50 carried by clutch handle leg 40B. Also, stop bolt 60 is positioned in apertures 62 in the walls of hollow leg 22B-1 of the mower handle, mower leg 22B-1 as shown in FIG. 6 also being on the right side of the mower as viewed from the rear of the mower.

With clutch control handle 40 having the mounting arrangement shown in FIGS. 3, 4, 6 and 9 in which clutch control handle 40 when in its unclutched position lies forwardly of the plane of mower handle 22, abutment 58A carried by the lower end of clutch control handle leg 40A abuts against stop bolt 60 carried by mower handle leg 22B-1 whereby to limit the movement of clutch control handle 40 in a counterclockwise (i.e., unclutching) direction relative to the views of FIGS. 3 and 4, and in which limiting position of clutch control handle 40 drive rollers 34 on shaft 28 are out of driving engagement with rear drive wheels 16.

With clutch control handle 40 mounted as shown in the views of FIGS. 3, 4, 6 and 9, if it is desired to cause drive rollers 34 to drivingly engage rear wheels 16, the operator, as in the mounting arrangement of FIGS. 1, 5 and 8, grasps cross bar 22B-3 of mower handle 22 and, at the same time, grasps cross bar 40C of clutch control handle 40, and "squeezes" clutch control handle 40 in a clockwise direction relative to the views of FIGS. 3 and 4, thereby swinging the rigidly interconnected bell cranks 30 in a counterclockwise direction relative to the view of the bell cranks in FIG. 1 about their respective pivotal axes 32 to cause frictional drive rollers 34 to drivingly engage rear wheels 16 of the mower, to thereby cause the mower to become self-propelled. If clutch control handle 40 is released, the biasing force of the tension on drive belt 38 will cause bell cranks 30 to return to their normal position in which frictional drive rollers 34 no longer drivingly engage rear wheels 16 of the mower, and through the connection of control linkage 54 will cause clutch control handle 40 to return to the unclutched position shown in the views of FIGS. 3 and 4.

Description of Folding Operation for Shipment or Storage

The collapsible mower handle 22 and the associated clutch control handle 40 and clutch control linkage 54 may be folded into a collapsed position in which the major portion of the collapsible assembly lies in a horizontal folded position as best seen in the views of FIGS. 1 and 2. Although the folding operation of the mower handle 22 and associated clutch control handle 40 and clutch control linkage 54 will be described with reference to the clutch control handle mounting arrangement embodied in FIG. 1, it will be understood that the description of the folding operation which follows applies equally to both of the hereinbefore described alternative mounting arrangements of the clutch control handle.

Assuming that the handle assembly and associated clutch control lever 40 and control linkage 54 are in the "in-use" extended position shown in full line in FIG. 1 of the drawings, if it is desired to collapse the mower handle 22 and associated clutch control handle 40 and clutch control linkage 54 to the collapsed position shown in phantom view in FIG. 1 and also as shown in the top plan view of FIG. 2, the following procedure is followed:

(1) the clamp bolt and nut members generally indicated at 24 in FIGS. 1 and 5 which secure the upper and lower mower handle sections 22B and 22A in the extended position shown in FIG. 1 are loosened to permit folding of upper handle section 22B relative to lower mower handle section 22A about the pivotal axis of the oppositely disposed bolt members 24A;

(2) upper mower handle section 22B is then swung about the pivotal axis of bolt members 24A in a clockwise direction (as viewed in FIG. 1) relative to lower mower handle section 22A through an angle of approximately 180 degrees to cause the upper and lower mower handle sections 22B and 22A to be positioned in contiguous "back-to-back" relation;

(3) the two oppositely disposed laterally spaced lower end portions, each generally indicated at 22C-1 (FIG. 7), of the respective legs 22A-1 and 22A-2 of the mower handle which are pivotally connected to pintles 25 on the corresponding oppositely disposed support brackets 23-1, 23-2 are "squeezed" together, as is permitted by the natural resiliency of the lower end portions 22C-1 of the mower handle, sufficiently to reduce the lateral spacing between the oppositely disposed end portions 22C-1 of the mower handle to permit the oppositely disposed lower end portions 22C-1 of the mower handle to laterally clear the overhanging lip portions 23-1A of the respective oppositely disposed support brackets 23-1, 23-2. The rearwardly facing end edge 23-1B of each respective lip portion 23-1A normally serves as an abutment which limits the forward or counterclockwise (relative to FIG. 1) pivotal swinging movement of mower handle 22 during normal operation of the mower;

(4) Lower mower handle section 22A may then be swung in a counterclockwise direction relative to the view in FIG. 1 toward the forward end of the mower about the pintles 25 which pivotally mount lower mower handle section 22A on support brackets 23-1, 23-2. When mower handle section 22A is folded forwardly or in a counterclockwise direction relative to the view of FIG. 1 about the oppositely disposed pintles 25, as just described, the lower section 54A of control linkage 54 also pivots in a counterclockwise direction relative to FIG. 1 about the pivotal connection 57 of control linkage section 54A to the rearwardly extending leg 30A of bell crank 30. The length of the lower control link section 54A from its pivot point 57 to the pivotal connection 55A-B defined by the pivotally connected link portions which connect the lower link portion 54A to the intermediate link portion 54B is such that when the lower portion 54A of control linkage 54 is in its forwardly inclined collapsed position, it abuts against the rearwardly inclined surface 19D of engine shroud 19 as best seen in the top view of FIG. 2. With mower handle 22, clutch handle 40 and control linkage 54 folded into the position shown in FIGS. 1 and 2, the upper end of control link section 54A at the pivotal connection 55A-B to the intermediate control link section 54B is substantially at the level of the upper flat surface of normally horizontal surface portions 19A-19B of engine shroud 19, whereby the intermediate control linkage section 54B may then fold forwardly relative to the front-rear dimension of the mower about the pivotal connection 55A-B into a substantially horizontal collapsed position as seen in FIGS. 1 and 2.

Also, in the collapsed or folded position of FIGS. 1 and 2, the normally uppermost control linkage section 54C which was folded with respect to the intermediate control link section 54B about the pivotal link connection 55B-C between control link sections 54B and 54C when upper mower handle section 22B was folded in a clockwise direction relative to lower mower handle section 22A as explained in step 2 of the folding operation, will also lie in a generally horizontal plane in the folded position shown in FIGS. 1 and 2. Additionally, in the collapsed or folded position of FIGS. 1 and 2, the clutch control handle 40 will assume a substantially horizontal position and will lie substantially in a common plane with upper mower handle section 22B.

In a slightly modified method of folding the mower handle and associated clutch control handle and clutch control linkage, the oppositely disposed lower end portions 22C-1 (FIG. 7) of the respective legs 22A-1 and 22A-2 of the mower handle may be "squeezed" together as described in step (3) to clear overhanging lip portions 23-1A of the oppositely disposed support brackets 23-1, 23-2 and the entire mower handle 22, including both lower and upper mower handle sections 22A and 22B may then both be swung together in a counterclockwise direction relative to the view in FIG. 1 to a substantially horizontal position about the pintles 25 to which lower mower handle section 22A is pivotally connected. Upper mower handle section 22B may then be swung about pivotal connections 24A, assuming wing nuts 24B have been loosened, in a clockwise direction as viewed in FIG. 1 relative to lower mower handle section 22A. The mower handle 22, the clutch control handle 40, and the clutch control linkage 54 will then all be in the same folded position for storage or shipment as a result of the modified folding operation just described, as in the case of the first described method of folding, and as shown in the phantom view of FIG. 1 and in the top plan view of FIG. 2.

With the mower handle and associated clutch control handle and clutch control linkage in the collapsed position shown in phantom in FIG. 1 and in full line in FIG. 5, if it is desired to return the mower handle and the associated clutch control handle and linkage to the elevated or extended "in-use" position shown in FIG. 1, the reverse procedure to the collapsing procedure just described is followed. That is, the lower mower handle section 22A is swung in a clockwise direction relative to the phantom view in FIG. 1 about the pintles 25 on support brackets 23-1, 23-2. The lower end portions 22C-1 of the oppositely disposed mower handle legs 22A-1 and 22A-2 are cammed laterally inwardly against the natural resiliency of mower legs 22A-1 and 22A-2 by the laterally inner edge of the respective overhanging lip portions 23-1A on the respective brackets 23-1, 23-2. However, as soon as mower handle legs 22A-1 and 22A-2 pass rearwardly beyond the respective end edges 23-1B of the overhanging lip portions 23-1A, the natural resiliency of legs 22A-1 and 22A-2 causes them to spring laterally outwardly against the laterally inner surface of the respective support brackets 23-1, 23-2, and in underlying relation to end edge 23-1B of the respective overhanging lip portions 23-1A, whereby the respective opposite end edges 23-1B serve as abutments which limit the counterclockwise pivotal movement of mower handle 22 relative to the view of FIG. 1 when the mower handle is in the "in-use" position shown in full line in FIG. 1.

Additionally, upper mower handle section 22B is swung upwardly about the pivotal connections 24A to lower mower handle section 22A to return mower handle 22 to the extended "in-use" position shown in FIG. 1. Bolt members 24 are retightened to secure the mower handle sections 22A, 22B in the extended position. When the mower handle is returned to the extended "in-use" position, clutch control handle 40 is moved by control linkage 54 to the position as shown in FIG. 1 or, alternatively, to the position shown in FIGS. 3 and 4, depending upon the particular mounting arrangement of the clutch control handle which is being used.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. In a walk-behind lawn mower of the self-propelled type and in which said mower comprises a prime mover, drive means constantly driven by said prime mover when said prime mover is in operation, drive wheels adapted to be driven by said prime mover through said drive means whereby to propel said mower along the ground, said drive means being adapted to be moved into driving engagement with said drive wheels, and in which said mower comprises a mower handle of generally U-shape including a pair of laterally spaced leg members lying in a common plane and a laterally extending cross bar connecting said leg members, the improvement which comprises a clutch control handle for moving said drive means into driving engagement with said drive wheels, said clutch control handle comprising a pair of laterally spaced leg members and a laterally extending cross bar connecting said leg members of said clutch control handle, said oppositely disposed leg members of said clutch control handle each being respectively pivotally connected to a corresponding one of said leg members of said mower handle, a crank member carried by and corresponding to each of said leg members of said clutch control handle contiguous the lower end of the respective leg members of said clutch control handle, each crank member being adapted to be connected by link means to said drive means, said clutch control handle being adapted to be pivotally mounted on said mower handle in a first mounting position in which said clutch control handle when in unclutched condition and the crank members carried thereby lie forwardly of said common plane, and to be pivotally mounted on said mower handle in a second mounting position in which said clutch control handle when in unclutched condition and the crank members carried thereby lie rearwardly of said common plane, said clutch control handle when in said second mounting position being rotated 180° relative to said first mounting position in its relation to said mower handle whereby in said second mounting position a given leg of said clutch control handle is pivotally connected to an opposite leg of said mower handle as compared to the pivotal connection of said given leg when said clutch control handle is in said first mounting position, link means operatively connecting one only of said crank members to said drive means when said clutch control handle is in each of said first and said second mounting positions, pivotal movement of said clutch control handle toward said common plane in either of said mounting positions being effective to move said drive means into driving engagement with said drive wheels, said link means being connected between said clutch control handle and said drive means on the same lateral side of said lawn mower in both said first and said second mounting positions of said clutch control handle, said link means being connected to a different one of said crank members in one of said mounting positions than in the other of said mounting positions, and means normally biasing said drive means out of driving engagement with said drive wheels.

2. In a walk-behind lawn mower as defined in claim 1 in which said improvement further comprises abutment means carried by one of said leg members of said clutch control handle, and cooperating abutment means carried by the contiguous leg of said mower handle, whereby to limit movement of said clutch control handle in the unclutching direction under the influence of said biasing means.

3. In a walk-behind lawn mower as defined in claim 1 in which said link means comprises means for adjusting the length of said link means.

4. In a walk-behind lawn mower as defined in claim 1 in which said mower comprises a mower deck and in which said mower handle is of the collapsible type and includes a lower mower handle section pivotally connected contiguous its lower end to pivot means on said mower deck and an upper mower handle section pivotally connected contiguous its lower end to the upper end of said lower mower handle section, means for normally securing said lower and said upper mower handle sections in extended nonfolded relation with respect to each other, said clutch control handle being pivotally connected to said upper mower handle section, said link means comprising a plurality of link sections pivotally connected to each other, whereby said lower mower handle section may be pivotally movable about its pivotal connection to said pivot means on said mower deck to a folded position in which a substantial portion of said lower mower handle section lies in a substantially horizontal plane, said upper mower handle section being foldable in a substantially horizontal back-to-back folded relation to said lower mower handle section with said lower mower handle section in said folded position, and whereby said link means folds upon itself when said lower and upper mower handle sections are pivotally moved into their respective folded positions, said lower and upper mower handle sections and said link means being foldable into their respective folded position in both said first and said second mounting positions of said clutch control handle.

5. In a walk-behind lawn mower as defined in claim 1 in which said drive means comprises a drive shaft, oppositely disposed laterally spaced friction drive rollers carried by said shaft and adapted to drivingly engage corresponding drive wheels of said mower, a pair of oppositely disposed laterally spaced mounting brackets mounted on said mower deck, a pair of oppositely disposed laterally spaced bell cranks respectively mounted for pivotal swinging movement each on a corresponding one of said mounting brackets, said drive shaft being supported for rotation by said oppositely disposed bell cranks, said link means being connected from said one only of said crank members to the bell crank on said same lateral side of said lawn mower in both said first and said second mounting positions of said clutch control handle, a torque rod rigidly interconnecting said oppositely disposed bell cranks to each other whereby said oppositely disposed bell cranks always move together as a unit, said drive shaft being adapted to be constantly driven by said prime mover when said prime mover is in operation, pivotal movement of said clutch control handle toward said common plane in either of said mounting positions being effective to pivotally swing said oppositely disposed bell cranks about their respective pivotal connections to said mounting brackets whereby to move said drive shaft and said laterally spaced friction drive rollers carried by said drive shaft into driving engagement with the drive wheels of said mower.

* * * * *